US010213871B2

(12) United States Patent
Kleinert et al.

(10) Patent No.: US 10,213,871 B2
(45) Date of Patent: Feb. 26, 2019

(54) METHOD AND APPARATUS FOR MARKING AN ARTICLE

(71) Applicant: ELECTRO SCIENTIFIC INDUSTRIES, INC., Portland, OR (US)

(72) Inventors: Jan Kleinert, Wilsonville, OR (US); Robert Reichenbach, Portland, OR (US); Mark Unrath, Portland, OR (US); Hisashi Matsumoto, Portland, OR (US); Jefferey Howerton, Portland, OR (US); Mehmet E. Alpay, Portland, OR (US); Andy Moore, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 1143 days.

(21) Appl. No.: 14/059,029

(22) Filed: Oct. 21, 2013

(65) Prior Publication Data
US 2014/0110384 A1    Apr. 24, 2014

Related U.S. Application Data

(60) Provisional application No. 61/716,921, filed on Oct. 22, 2012.

(51) Int. Cl.
*B23K 26/00* (2014.01)
*B23K 26/02* (2014.01)
(Continued)

(52) U.S. Cl.
CPC .......... *B23K 26/082* (2015.10); *B23K 26/352* (2015.10); *B23K 26/0006* (2013.01); *B23K 26/009* (2013.01)

(58) Field of Classification Search
CPC ...... B23K 236/0006; B23K 26/0066–26/0087; B23K 26/0807; B23K 26/0006;
(Continued)

(56) References Cited

U.S. PATENT DOCUMENTS 4,547,649 A   10/1985 Butt et al.
5,463,200 A   10/1995 James et al.
(Continued)

FOREIGN PATENT DOCUMENTS

CN   102176996 A   9/2011
CN   20231744 U    7/2012
(Continued)

OTHER PUBLICATIONS

Steve Gorton et al., "Laser Array Technology Makes Its Mark", Apr. 2009, 4 pages.
(Continued)

*Primary Examiner* — Sang Y Paik

(57) ABSTRACT

The invention is a method and an apparatus for marking an article and the article thus marked. It includes providing the article. Generating a plurality of groups of laser pulses. At least one of the plurality of groups is generated by modulating a beam of laser pulses to form a plurality of beamlets. Each, of the plurality of beamlets, include at least one laser pulse. It also includes directing the plurality of groups of laser pulses onto the article such that laser pulses within the at least one of the plurality of groups impinge upon the article at spot areas that do not overlap one another, wherein laser pulses within the plurality of groups are configured to produce a visible mark on the article.

34 Claims, 8 Drawing Sheets

(51) Int. Cl.
*B23K 26/082* (2014.01)
*B23K 26/352* (2014.01)

(58) Field of Classification Search
CPC .................................. B23K 26/009–26/0096;
B23K 26/08–26/082; B23K 26/352–26/355
USPC .......................................... 219/121.6–121.83
See application file for complete search history.

(56) References Cited

U.S. PATENT DOCUMENTS

| | | | |
|---|---|---|---|
| 5,521,628 A | 5/1996 | Montgomery | |
| 5,632,916 A | 5/1997 | Lappalainen et al. | |
| 5,751,585 A | 5/1998 | Cutler et al. | |
| 5,767,483 A | 6/1998 | Cameron et al. | |
| 5,837,962 A | 11/1998 | Overbeck | |
| 5,990,444 A | 11/1999 | Costin | |
| 6,423,935 B1 | 7/2002 | Hackel et al. | |
| 6,433,301 B1 | 8/2002 | Dunsky et al. | |
| 6,706,999 B1 | 3/2004 | Barrett et al. | |
| 6,774,340 B1 | 8/2004 | Chiba et al. | |
| 6,791,592 B2 | 9/2004 | Assa et al. | |
| 6,836,284 B2 | 12/2004 | Murokh et al. | |
| 7,019,891 B2 | 3/2006 | Johnson | |
| 7,058,109 B2 | 6/2006 | Davis | |
| 7,148,447 B2 | 12/2006 | Ehrmann et al. | |
| 7,329,830 B2 | 2/2008 | Baudron et al. | |
| 7,521,649 B2 * | 4/2009 | Umetsu et al. | 219/121.65 |
| 8,178,818 B2 | 5/2012 | Baird et al. | |
| 8,379,678 B2 | 2/2013 | Zhang et al. | |
| 8,379,679 B2 | 2/2013 | Zhang et al. | |
| 8,389,895 B2 | 3/2013 | Reichenbach et al. | |
| 8,451,871 B2 | 5/2013 | Yankov | |
| 8,451,873 B2 | 5/2013 | Zhang | |
| 8,604,380 B2 | 12/2013 | Howeverton et al. | |
| 8,648,277 B2 | 2/2014 | Alpay et al. | |
| 9,023,461 B2 | 5/2015 | Brookhyser et al. | |
| 2001/0023858 A1 | 9/2001 | Moss et al. | |
| 2003/0039765 A1 | 2/2003 | Hayakawa et al. | |
| 2004/0000490 A1 | 1/2004 | Chang et al. | |
| 2006/0000814 A1 | 1/2006 | Gu et al. | |
| 2007/0224768 A1 * | 9/2007 | Chaplick et al. | 438/308 |
| 2010/0054287 A1 | 3/2010 | Ghauri | |
| 2011/0089039 A1 | 4/2011 | Nashner | |
| 2011/0089067 A1 | 4/2011 | Scott et al. | |
| 2011/0123737 A1 | 5/2011 | Nashner | |
| 2011/0194574 A1 * | 8/2011 | Zhang et al. | 372/25 |
| 2011/0259631 A1 * | 10/2011 | Rumsby | 174/264 |
| 2011/0292157 A1 | 12/2011 | Ghauri | |
| 2012/0281195 A1 | 11/2012 | Sandström | |
| 2014/0015170 A1 | 1/2014 | Reichenbach et al. | |

FOREIGN PATENT DOCUMENTS

| | | | |
|---|---|---|---|
| EP | 1758045 A1 | 2/2007 | |
| GB | 2405992 B | 1/2007 | |
| JP | 2001-71391 A | 3/2001 | |
| JP | 2001-232848 A | 8/2001 | |
| JP | 2003-340819 A | 12/2003 | |
| JP | 2005-144487 A | 6/2005 | |
| JP | 04030731 B2 | 1/2008 | |
| JP | 2010-156901 A | 7/2010 | |
| JP | 2012-081488 A | 4/2012 | |
| JP | 2012-206126 A | 10/2012 | |
| JP | 2013-004532 A | 1/2013 | |
| WO | 2010/011227 A1 | 1/2010 | |
| WO | WO2011/043734 A1 | 4/2011 | |
| WO | WO2011047325 A1 | 4/2011 | |
| WO | WO2012/121734 A1 | 9/2012 | |
| WO | WO2012/167999 A1 | 12/2012 | |

OTHER PUBLICATIONS

International Search Report of PCT/US2013/065946, 2 pages.
Written Opinion of PCT/US2013/065946, 6 pages.
European Search Report, dated Oct. 8, 2015, concerning EP Pat. Application No. 11860642 (which corresponds with U.S. Appl. No. 12/871,588), 6 pages.
English translation of the Mar. 2, 2016 Office Action concerning Chinese Patent Application No. 201380053669.0, which corresponds with the U.S. Appl. No. 14/059,029.
English translation of the Nov. 21, 2017 Office action concerning Japanese Patent Application No. 2015-538114, 7 pages.
English translation of the Jul. 20, 2017 Office action concerning Chinese Patent Application No. 2013-80053669.0.
English translation of the Jan. 31, 2018 Office action concerning Taiwanese Patent Application No. 02138044, 5 pages.

* cited by examiner

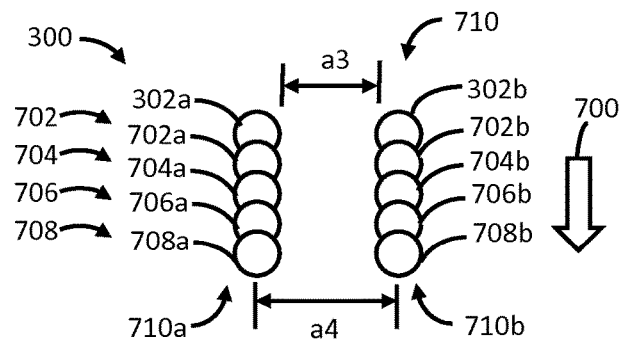
FIG. 7
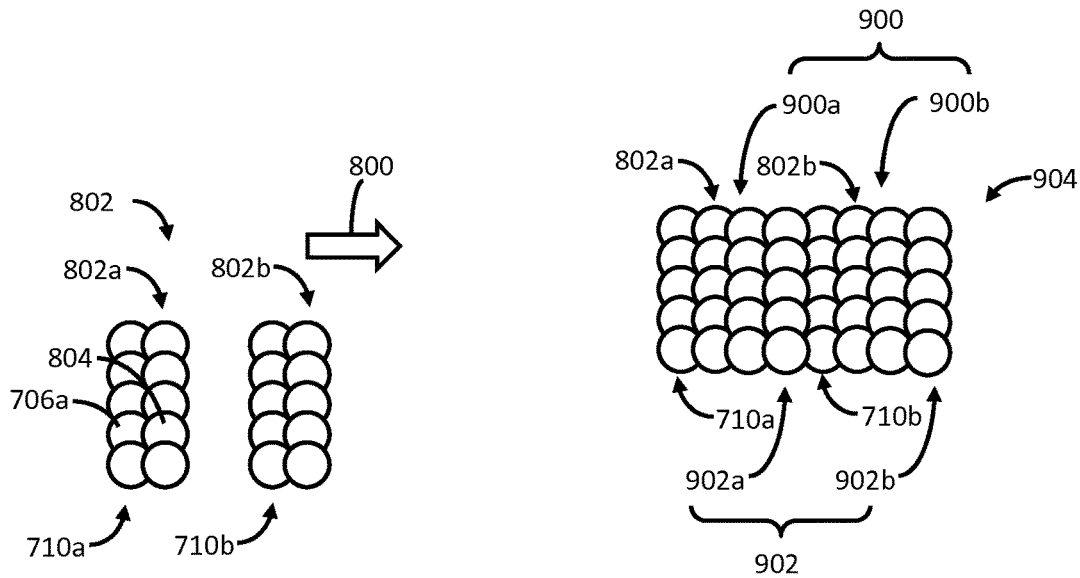
FIG. 8
FIG. 9

METHOD AND APPARATUS FOR MARKING AN ARTICLE

CROSS-REFERENCE TO RELATED APPLICATIONS

This application is a Non-Provisional Patent Application of a U.S. Provisional Application No. 61/716,921 filed Oct. 22, 2012, which is related to U.S. application Ser. No. 12/704,293, filed Feb. 11, 2010, now issued with a U.S. Pat. No. 8,379,679, issued Feb. 19, 2013, Ser. No. 12/823,895, filed Jun. 25, 2010, now issued with a U.S. Pat. No. 8,389,895, issued Mar. 5, 2013, Ser. No. 12/859,498, filed Aug. 19, 2010, now pending, Ser. No. 12/871,588, filed Aug. 30, 2010, now issued with a U.S. Pat. No. 8,451,871 issued May 28, 2013, Ser. No. 12/871,619, filed Aug. 30, 2010, now issued with a U.S. Pat. No. 8,379,678, issued Feb. 19, 2013, Ser. No. 12/909,759, filed Oct. 21, 2012, now pending, and a U.S. Provisional Application No. 61/669,780, filed Jul. 10, 2012 and claims the benefit of each, with the contents of each of incorporated by reference for all purposes.

BACKGROUND

Consumer products, such as electronic devices (e.g., mobile phones, portable media players, personal digital assistants, computers, monitors, etc.), have been marked with information for commercial, regulatory, cosmetic or functional purposes. For example, it is common for electronic devices to be marked with serial numbers, model numbers, copyright information, alphanumerical characters, logos, operating instructions, decorative lines, patterns, and the like. Desirable attributes for a mark include the shape, color, optical density, and any other attribute that may affect the appearance of the mark.

Numerous processes can be used to produce a mark on a product or article depending on, for example, the nature of the article itself, the desired appearance of the mark, the desired durability of the mark, and the like. Marking processes have been developed that use lasers to produce visible marks on metallic articles, polymeric articles, and the like. A conventional marking process is understood to involve directing a beam of laser pulses to impinge upon the article at spot areas, and raster-scanning the beam within an area to be marked. Thus marks formed by conventional marking processes are generally composed of a series of successively-formed, and overlapping, scan lines that are each formed of a series of successively-formed, and overlapping, spot areas. Conventionally, the throughput of such marking processes has been increased simply by increasing the pulse repetition rate (e.g., such that a period between pulses is in a range from 500 ns to 1 µs) and scan speed (e.g., to maintain a desired bite size) while maintaining a constant pulse energy. However, the inventors have discovered that this throughput enhancing process only works up to a point, after which the rapid accumulation of successively-directed laser pulses on the article during the marking process actually creates undesirable defects (e.g., cracks, material warping, modified crystalline structures, pits, etc.) that can physically or chemically damage the article or undesirably change the visual appearance of the article. The inventors have further discovered that such rapid accumulation of successively-directed laser pulses onto the article can also degrade the appearance of the mark that is ultimately formed. Thus it would be desirable if a laser marking process existed that had a high throughput and avoided these and other problems associated with the rapid accumulation of successively-directed laser pulses onto the article.

BRIEF DESCRIPTION OF THE DRAWINGS

FIGS. 7 and 8 schematically illustrate a marking process according to one embodiment. FIG. 9 schematically illustrates an exemplary arrangement of spot areas generated as a result of the marking process described with respect to FIGS. 7 and 8.

DETAILED DESCRIPTION OF THE ILLUSTRATED EMBODIMENTS

Figure 1:
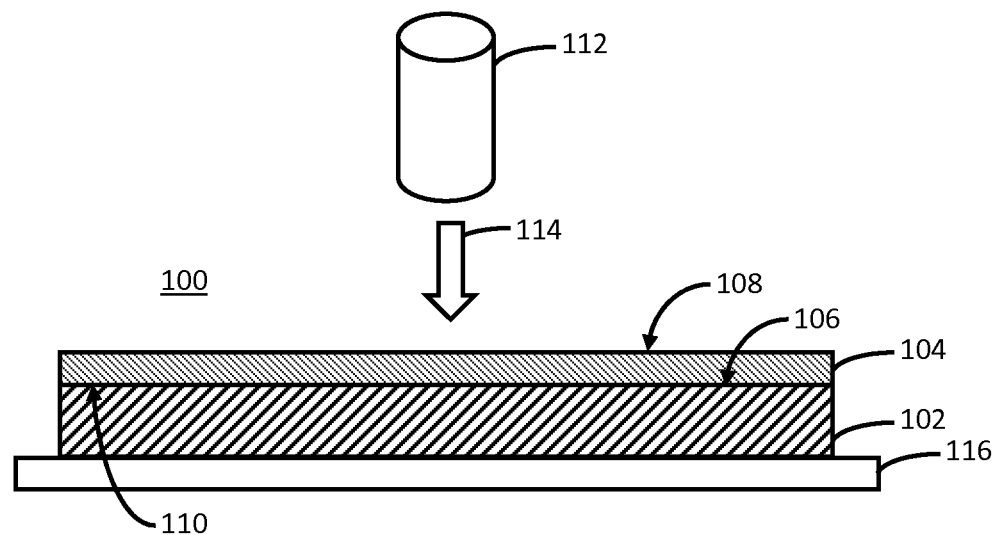
FIG. 1 schematically illustrates one embodiment of an article to be marked according to a marking process, and an apparatus configured to perform a marking process to mark the article.

The following embodiments are described in sufficient detail to enable those skilled in the art to make and use the invention. It is to be understood that other embodiments would be evident based on the present disclosure, and that process or mechanical changes may be made without departing from the scope of the present invention defined in the claims. In the following description, numerous specific details are given to provide a thorough understanding of the invention. However, it will be apparent that the invention may be practiced without these specific details. In order to avoid obscuring the present invention, some well-known system configurations and process steps are not disclosed in detail. Likewise, the drawings showing embodiments of the system are schematic and not to scale and, particularly, some of the dimensions are for the clarity of presentation and are shown greatly exaggerated in the drawing FIGS. Unless otherwise specified, a range of values, when recited, includes both the upper and lower limits of the range, as well as any sub-ranges therebetween. In addition, where multiple embodiments are disclosed and described having some features in common, for clarity and ease of illustration, description, and comprehension thereof, similar and like features one to another will ordinarily be described with like reference numerals.

Referring to FIG. 1, an article such as article 100 includes a substrate 102 and a film or layer 104. The substrate 102 can be formed of a material such as a metal or metal alloy. For example, the substrate can be formed of a metal such as aluminum, titanium, zinc, magnesium, niobium, tantalum, or the like or an alloy containing one or more of aluminum, titanium, zinc, magnesium, niobium, tantalum, or the like. The layer 104 can be a material such as a metal oxide. In one embodiment, the layer 104 includes an oxide of one or more metals within the substrate 102, but could include an oxide of a metal not found in the substrate 102. The layer 104 may be formed by any suitable process. For example, the layer 104 can be formed by a physical vapor deposition process, a chemical vapor deposition process, an anodization process (e.g., involving exposure to chromic acid, sulfuric acid, oxalic acid, sulfosalicylic acid, phosphoric acid, borate or tartrate baths, or the like, to a plasma, or the like or a combination thereof), or the like or a combination thereof. Generally, a thickness of the layer 104 can be about 50 μm or less. In one embodiment, the layer 104 acts to protect a surface (e.g., surface 106) of the substrate 102 from abrasion, oxidation, or other corrosion. Thus, the layer 104 can also be referred to herein as a "passivation layer" or "passivation film."

In the illustrated embodiment, the layer 104 adjoins (i.e., directly contacts) the substrate 102. In other embodiments, however, the layer 104 can be adjacent to the substrate 102, but not contact the substrate 102. For example, an intervening layer (e.g., a native oxide layer having a different composition from the layer 104, a different structure from the layer 104, etc.) can be located between the substrate 102 and the layer 104. Although the article 100 has been described as including a metallic substrate 102, it will be appreciated that the substrate 102 may be formed of any material such as a polymer (e.g., high-density polyethylene, acrylonitrile butadiene styrene, polypropylene, polyethylene terephthalate, polyvinyl chloride, thermoplastic elastomers, etc.), or the like. Further, although the article 100 is illustrated as including the layer 104, it will be appreciated that the layer 104 may be omitted. In some embodiments, the article 100 may be provided as exemplarily described in any of U.S. application Ser. Nos. 12/704,293, 12/823,895, 12/859,498, 12/871,588, 12/871,619, 12/909,759, and U.S. Provisional Application No. 61/669,780, the contents of each of which are incorporated herein by reference.

Constructed as described above, the article 100 and can be provided as at least a portion of a housing for device such as a personal computer, a laptop computer, a tablet computer, a personal digital assistant, a portable media player, a television, a computer monitor, a telephone, a mobile phone, an electronic book, a remote controller, a pointing device (e.g., a computer mouse), a game controller, a thermostat, a dishwasher, a refrigerator, a microwave, or the like, or may be provided as a button of any other device or product, or may be provided as a sign or badge, or the like. Constructed as described above, the article 100 includes a surface (e.g., a first surface 108 of the layer 104) having a visual appearance. Thus, the visual appearance of the article 100 at the surface 108 can be characterized as a result of the interaction between characteristics of the substrate 102 (e.g., including material composition, molecular geometry, crystal structure, electronic structure, microstructure, nanostructure, texture of the surface 106, or the like or a combination thereof), characteristics of the layer 104 (e.g., the material composition, thickness, molecular geometry, crystal structure, electronic structure, microstructure, nanostructure, texture of the first surface 108, texture of a second surface 110 opposite the first surface 108, or the like or a combination thereof), the characteristics of the interface between surfaces 106 and 110, the characteristics of the substrate 102 and/or the layer 104 at or near the interface, or the like or a combination thereof.

Figure 2:
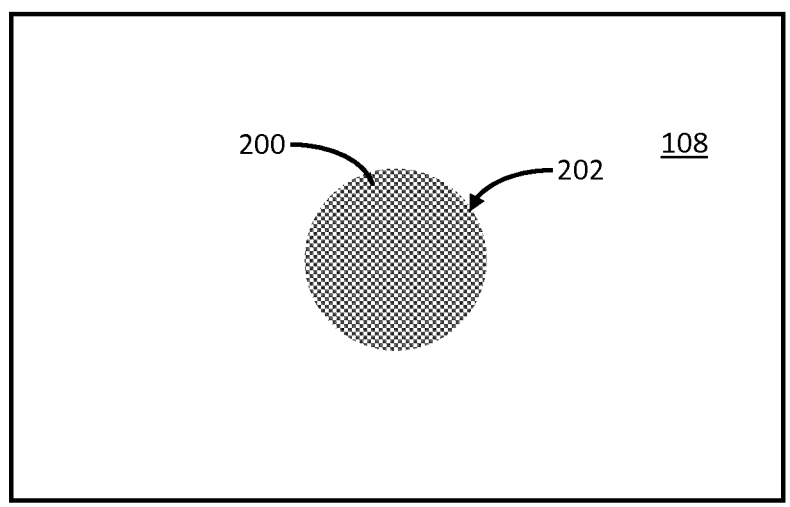
FIG. 2 illustrates a plan view of an exemplary mark capable of being formed on an article using the apparatus described with respect to FIG. 1.

According to embodiments of the present invention, the visual appearance of a portion of the article 100 (also referred to herein as a "preliminary visual appearance") can be modified to form a mark (e.g., mark 200, as shown in FIG. 2) on the article 100, having a modified visual appearance which is different from the preliminary visual appearance and is visible at the surface 108 of the article 100. The mark 200 may be formed at the surface 108 of the article 100, below the surface 108 of the article 100 (e.g., between surfaces 108 and 110, at the interface between surfaces 110 and 106, below the surface 106, or the like or a combination thereof), or a combination thereof. The mark 200 can include an edge 202, which generally delineates the location on the article 100 at which the modified visual appearance meets the preliminary visual appearance. Although the mark 200 is illustrated in a single specific form, it will be appreciated that the mark 200 can have any shape, and more than one mark can be provided. In some examples, the mark 200 can be textual, graphic, or the like or a combination thereof, and may convey information such as the name of a product, the name of a product manufacturer, a trademark, copyright information, design location, assembly location, model number, serial number, license number, an agency approval, standards compliance information, an electronic code, a logo, a certification mark, an advertisement, a user-customizable feature, or the like or a combination thereof.

In one embodiment, both the preliminary and modified visual appearance can be described using CIE 1976 L* a* b* (also known as CIELAB), which is a color space standard specified by the International Commission on Illumination (French Commission internationale de l'éclairage). CIELAB describes colors visible to the human eye and was created to serve as a device-independent model to be used as a reference. The three coordinates of the CIELAB standard represent: 1) the lightness factor magnitude of the color (L*=0 yields ultimate black and L*=100 indicates diffuse ultimate white, 2) its position between red/magenta and green (a*, negative values indicate green while positive values indicate magenta) and 3) its position between yellow and blue (b*, negative values indicate blue and positive values indicate yellow). Measurements in a format corresponding to the CIELAB standard may be made using a spectrophotometer, such as the COLOREYE® XTH Spectrophotometer, sold by GretagMacbeth®. Similar spectrophotometers are available from X-Rite™.

In one embodiment, the modified visual appearance of the mark 200 may be darker than the preliminary visual appearance of the article 100. For example, the article 100 can have a preliminary visual appearance with a lightness factor magnitude, L*, of about 80, and the mark 200 can have a modified visual appearance with a desired lightness factor magnitude, L*, value of less than 37, less than 36, or less than 35 or less than 34 (or at least substantially equal to 34). In another example embodiment, the article 100 can have a preliminary visual appearance with a lightness factor magnitude, L*, of about 25, and the mark 200 can have a modified visual appearance with a desired lightness factor magnitude, L*, value of less than 20 or less than 15 (or at least substantially equal to 15). It will be appreciated, however, that the mark 200 can have any L*, a* and b* values depending upon the characteristics of the article 100 and the specific process used to form the mark 200. In addition, the modified visual appearance of the mark 200 may be at least substantially uniform across the area of the mark 200, or may vary (e.g., in terms of one or more of L*, a* and b* values).

Generally, the mark 200 may be formed by a process that includes sequentially directing groups of pulses of laser light (also referred to herein as "laser pulses") onto the article 100, wherein laser pulses within the groups are configured to produce a visible mark (e.g., mark 200) on the article 100. As exemplarily shown in FIG. 1, an apparatus for performing the marking process described herein may include a laser system 112 configured to generate and direct the laser pulses toward the article 100 along the direction indicated by arrow 114. In one embodiment, the laser system 112 optionally includes a stage or chuck 116 (generically referred to as an "article support") configured to support the article 100 during the marking process. In another embodiment, the apparatus may further include one or more motors, actuators, or the like or a combination thereof (not shown), coupled to the article support 116 to move (e.g., rotate or linearly translate) the article 100 relative to the laser system 112 during the marking process.

Although not illustrated, the laser system 112 may include one or more laser sources configured to generate the laser pulses, a beam modification system operative to modify (e.g., shape, expand, focus, or the like or a combination thereof) the laser pulses, a beam steering system (e.g., one or more galvo-mirrors, fast-steering mirrors, acousto-optic deflectors, or the like or a combination thereof) operative to scan the laser pulses along a route on or within the article 100, or the like or a combination thereof. Laser pulses generated by the laser system 112 may be Gaussian, or the apparatus may optionally include beam shaping optics configured to reshape the laser pulses as desired.

Characteristics of the laser pulses (e.g., pulse wavelength, pulse duration, average power, peak power, spot fluence, scan rate, pulse repetition rate, spot shape, spot diameter, or the like or a combination thereof), can be selected to form a mark 200 having a desired appearance. For example, the pulse wavelength can be in the ultra violet range, visible range, or infrared range of the electromagnetic spectrum (e.g., in a range from 238 nm to 10.6 μm, such as 343 nm, 355 nm, 532 nm, 1030 nm, 1064 nm, or the like), the pulse duration (e.g., based on full width at half-maximum, or FWHM) can be in a range from 0.1 picosecond (ps) to 1000 nanoseconds (ns) (e.g., in one embodiment, in a range from 0.5 ps to 10 ns and, in another embodiment, in a range from 5 ps to 10 ns), the average power of the laser pulses can be in a range from 0.05 W to 400 W, the scan rate can be in a range from 10 mm/s to 1000 mm/s, the pulse repetition rate can be in a range from 10 kHz to 1 MHz, and the spot diameter (e.g., as measured according to the $1/e^2$ method) can be in a range from 3 μm to 1 mm (e.g., in a range from 5 μm to 350 μm, in a range from 10 μm to 100 μm, or the like). It will be appreciated that any of the aforementioned laser pulse characteristics can be varied in any manner within or outside the ranges discussed above depending on, for example, the material from which the substrate 102 is formed, the material from which the layer 104 is formed, the desired appearance of the mark 200, the particular configuration of the laser system 112 (e.g., which may include a beamlet generator having one or more modulation elements, as discussed in greater detail below), or the like or a combination thereof. In some embodiments, and depending on factors such as the article 100 to be marked, the desired appearance of the mark 200, etc., laser pulses directed onto the article 100 can have laser pulse characteristics as exemplarily described in any of U.S. application Ser. Nos. 12/704,293, 12/823,895, 12/859,498, 12/871,588, 12/871,619, 12/909,759, and U.S. Provisional Application No. 61/669,780, the contents of each of which are incorporated herein by reference.

As mentioned above, the mark 200 may be formed by a process that includes sequentially directing groups of laser pulses onto the article 100 such that each directed laser pulse impinges upon the article 100 at a corresponding spot area. Generally, the aforementioned laser pulse characteristics are selected such that at least one characteristic (e.g., a chemical composition, molecular geometry, crystal structure, electronic structure, microstructure, nanostructure, or the like or a combination thereof) of the portion of the article 100 proximate to the spot area is modified or altered in a desired manner. As a result of this modification, the preliminary visual appearance of the article 100 at a location corresponding to the location of the spot area also becomes modified. Thus after multiple groups of laser pulses are directed onto the article 100, the visual appearance of the article 100 can be modified to form the mark 200.

Figure 3:
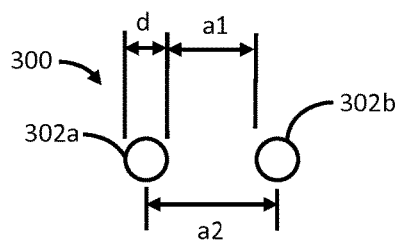
FIGS. 3 to 6 schematically illustrate some embodiments of sets of spot areas that may be generated on an article when laser pulses within a group of laser pulses impinge upon the article during a marking process.

Referring to FIG. 3, a group of laser pulses can include only two laser pulses that impinge upon the article 100 to generate a set of spot areas (also referred to herein as a "spot set"), such as spot set 300, on the article 100. Each of the first spot area 302a and the second spot area 302b have a $1/e^2$ spot diameter (also referred to herein as a "spot width"), d, measured along a common line or axis passing through the centers of spot areas 302a and 302b (also referred to herein as the "spot-to-spot axis"). In addition, the second spot area 302b is spaced apart from the first spot area 302a by a spot separation distance, a1. That is, a1>d. The center-to-center distance between spot areas 302a and 302b within spot set 300 can be referred to the "spot separation pitch," a2. Although FIG. 3 illustrates the spot areas within spot set 300 as being circular, it will be appreciated that any spot area within the spot set can have any other shape (e.g., elliptical, triangular, etc.).

While not wishing to be bound by any particular theory, the inventors believe that the aforementioned defects and degradation in mark appearance associated with the conventional throughput-enhancing process are at least partly the result of high thermal loads generated within the article by the rapid accumulation of two or more laser pulses successively directed onto overlapping, or relatively spatially close, spot areas on the article 100. According to embodiments of the present invention, however, the magnitude of the spot separation distance, a1, between neighboring or adjacent spot areas in a spot set such as spot set 300 is selected to ensure that heat generated within the article 100 due to a laser pulse impinging the article 100 at one spot area (e.g., spot area 302a) is effectively prevented from being transferred to a region of the article 100 where another spot area (e.g., spot area 302b) is formed. Thus the spot separation distance, a1, between spot areas in a spot set is selected to ensure that, during the process of forming a spot set, different portions of the article 100 at spot areas within the spot set are at least substantially thermally independent of one another. By ensuring that spot areas are located on the article at positions that are relatively spatially distant from each other, marking processes according to embodiments of the present invention can be adapted to form a mark having a desirable appearance faster than the conventional marking process, while also overcoming the aforementioned limitations associated with high thermal loads that can undesirably damage the article 100 (e.g., by generating cracks within the layer 104, by inducing at least a partial delamination of the layer 104 from the substrate 102, or the like, or a combination thereof), or that can undesirably change the visual appearance of the article 100, or the like or a combination thereof.

It will be appreciated that the magnitude of the spot separation distance, a1, may depend upon one or more factors such as the fluence of the laser pulses associated with each spot area, the thermal conductivity of one or more portions of the article 100, the size and shape of each spot area on the article 100, or the like or a combination thereof. For example, in embodiments where the article 100 is an anodized metallic article (e.g., having a substrate 102 formed of aluminum or an alloy thereof and a layer 104 formed of anodic aluminum oxide), the spot separation distance, a1, between spot areas 302a and 302b may be in a range from 3 μm to 3 mm (e.g., about 5 μm, about 10 μm, or the like, or in a range from 150 μm to 3 mm, in a range from 200 μm to 3 mm, in a range from 300 μm to 3 mm, in a range from 400 μm to 3 mm, in a range from 500 μm to 3 mm, or the like). In some embodiments, the spot separation distance, a1, may be greater than the spot diameter, d, but less than six times larger than the spot diameter, d (i.e., 6d>a1>d). In other embodiments, the spot separation distance, a1, may be less than the spot diameter, d, or greater than six times larger than, the spot diameter, d (i.e., a1>3d, or a1<d).

In one embodiment, the laser pulse generating spot area 302a may impinge upon the article 100 at the same time as the laser pulse generating spot area 302b. In other embodiments, however, the laser pulse generating spot area 302a may impinge upon the article 100 before or after the laser pulse generating spot area 302b. In such embodiments, the period between generation of the spot areas 302a and 302b can be in a range from 0.1 μs to 30 μs (e.g., in one embodiment, in a range from 1 μs to 25 μs and, in another embodiment, in a range from 2 μs to 20 μs). Depending upon factors such as the configuration of the laser system 112, the spot separation distance, a1, and the like, the period between generation of the spot areas 302a and 302b can be less than 0.1 μs or greater than 30 μs.

Figure 4:
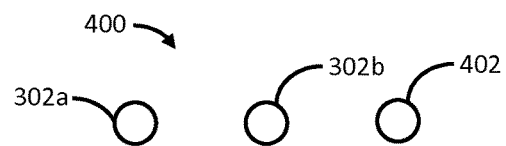
Figure 5:
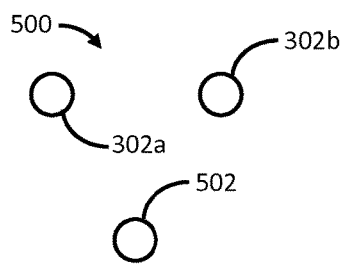
Figure 6:
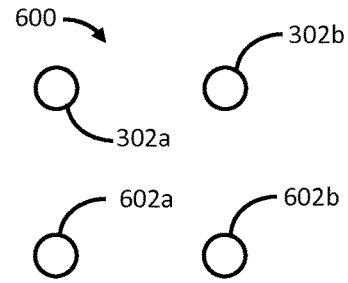

Although FIG. 3 illustrates wherein the spot set 300 includes only two spot areas (i.e., first spot area 302a and second spot area 302b), it will be appreciated that a group of laser pulses can include more than two laser pulses (e.g., 10 or more laser pulses) that impinge upon the article 100 to generate a set having a more than two spot areas (e.g., 10 or more spot areas) spatially arranged relative to each other to form a beneficial otherwise suitable pattern of spot areas. For example, a group of laser pulses can include three laser pulses that impinge the article 100 to generate a spot set such as spot set 400 having the first spot area 302a, second spot area 302b and a third spot area 402, spatially arranged in a linear pattern as shown in FIG. 4. In another example, a group of laser pulses can include three laser pulses that impinge the article 100 to generate a spot set such as spot set 500 having the first spot area 302a, the second spot area 302b and a third spot area 502, spatially arranged in a triangular pattern as shown in FIG. 5. In yet another example, a group of laser pulses can include four laser pulses that impinge the article 100 to generate a spot set such as spot set 600 having the first spot area 302a, the second spot area 302b, and a third spot area 602a and a fourth spot area 602b spatially arranged in a square or rectangular pattern as shown in FIG. 6. Within a spot set the separation distance between one pair of neighboring or adjacent spot areas (e.g., between spot areas 302b and 402, as shown in FIG. 4, between spot areas 302b and 502, as shown in FIG. 5, or between spot areas 302b and 602b, as shown in FIG. 6) may be the same or different as the separation distance between any other pair of neighboring or adjacent spot areas (e.g., between spot areas 302a and 402, as shown in FIG. 4, between spot areas 302a and 502, as shown in FIG. 5, or between spot areas 602a and 602b, as shown in FIG. 6).

As mentioned above, the mark 200 may be formed by a process that includes sequentially directing groups of laser pulses onto the article 100. For example, and with reference to FIG. 7, after a first group of laser pulses is directed onto the article 100 to generate a first spot set (e.g., the aforementioned spot set 300), the laser system 112 may be actuated and/or the article support 116 may be moved such that additional groups of laser pulses are sequentially directed onto the article 100 to generate additional spot sets offset from one another along the direction indicated by arrow 700 (also referred to herein as the "scan direction"). For example, a second group of laser pulses is directed onto the article 100 to generate a second spot set 702 (e.g., which includes spot areas 702a and 702b). Thereafter, a third group of laser pulses is directed onto the article 100 to generate a third spot set 704 (e.g., which includes spot areas 704a and 704b). Fourth and fifth groups of laser pulses are subsequently and sequentially directed onto the article 100 to generate a fourth spot set 706 (e.g., which includes spot areas 706a and 706b) and a fifth spot set 708 (e.g., which includes spot areas 708a and 708b).

In the illustrated embodiment, the spatial arrangement of spot areas in one spot set is the same as the spatial arrangement of spot areas in every other spot set. In other embodiments, however, the spatial arrangement of spot areas in one spot set can be different from the spatial arrangement of spot areas in any other spot set. Further, laser pulse characteristics of laser pulses within one group of laser pulses may be the same as, or different from, laser pulse characteristics of laser pulses within another group of laser pulses. Although the scan direction 700 is illustrated as being perpendicular to the spot-to-spot axis of each of the spot sets 300, 702, 704, 706 and 708, it will be appreciated that the scan direction 700 may extend along a direction that is oblique with respect to (or parallel to) the spot-to-spot axis of any or all of the spot sets. Thus, scan lines (e.g., scan lines 710a and 710b) within a line set (e.g., line set 710) may be separated by a line separation distance, a3, that may be less than or equal to the spot separation distance, a1. The center-to-center distance between a spot area (e.g., spot area 702a) in one scan line 710a and a corresponding spot area (e.g., spot area 702b) in the other scan line 710b within the line set 710 can be referred to the "line set pitch," a4.

The process of sequentially directing groups of laser pulses along the scan direction 700 may be continued and repeated as desired to form a set 710 of scan lines (also referred to as a "line set") on the article 100 (e.g., which includes scan lines 710a and 710b). For purposes of discussion, the process of forming one line set will be referred to as a "scanning process" and spot areas within a scan line are aligned relative to one another along the scan direction 700. Generally, laser pulses within different groups of laser pulses may be directed onto the article 100 such that a resultant scan line is formed by spot areas that overlap one another. The degree to which adjacent spot areas overlap (i.e., the "bite size" or "scan pitch") can be defined as the center-to-center distance between overlapping spot areas in a scan line, measured along the scan direction 700. The bite size may be constant along the scan direction 700, or may vary. Laser pulse characteristics (e.g., pulse repetition rate, scan rate, or the like or a combination thereof), can be selected such that the period between the generation of successively-formed spot areas within the same scan line is greater than the aforementioned temporal period between the generation of adjacent or neighboring spot areas within the same spot set. By ensuring that spot areas generated within the same scan line are relatively temporally distant from each other, marking processes according to embodiments of the present invention can be adapted to form a mark having a desirable appearance faster than the conventional marking process, while also overcoming the aforementioned limitations associated with high thermal loads that can undesirably damage the article 100 (e.g., by generating cracks within the layer 104, by inducing at least a partial delamination of the layer 104 from the substrate 102, or the like, or a combination thereof), or that can undesirably change the visual appearance of the article 100, or the like or a combination thereof.

Referring to FIG. 8, after a first line set is formed (e.g., the aforementioned line set 710), the laser system 112 may be actuated and/or the article support 116 may be moved such that additional line sets can be formed to generate additional scan lines offset from previously-formed scan lines along the direction indicated by arrow 800 (also referred to herein as the "fill direction"). As exemplarily shown, the aforementioned scanning process described with respect to FIG. 7 may be repeated to form a second line set such as line set 802, which includes scan lines 802a and 802b. Generally, laser pulses within different groups of laser pulses may be directed onto the article 100 such that a resultant scan line (e.g., scan line 802a) in the second line set 802 overlaps a corresponding scan line (e.g., scan line 710a) in the first line set 710. The degree to which adjacent scan lines overlap (i.e., the "line pitch") can be defined as the center-to-center distance between neighboring or adjacent spot areas in adjacent scan lines, measured along the fill direction 800. In one embodiment, the line pitch may be an integer divisor of the line set pitch a4. The line pitch between a pair of adjacent scan lines may be constant along the scan direction 700, or may vary. Further, the line pitch between pairs of adjacent scan lines may be constant along the fill direction 800, or may vary. In the illustrated embodiment, the spot sets forming the scan lines 802a and 802b of the second line set 802 are the same as spot sets forming the scan lines 710a and 710b of the first line set 710. In other embodiments, however, the spot sets forming the scan lines 802a and 802b of the second line set 802 may be different from the spot sets forming the scan lines 710a and 710b of the first line set 710. Further, the characteristics of the second scanning process (e.g., pulse repetition rate, scan rate, line pitch, bite size, or the like or a combination thereof) associated with forming the second line set 802 can be selected such that the period between the generation of a spot area (e.g., spot area 804) in the second line set 802 and the generation of a corresponding spot area (e.g., spot area 706a) in the first line set 710a is greater than the aforementioned temporal period between the generation of adjacent or neighboring spot areas within the same spot set. By ensuring that corresponding spot areas generated within neighboring or adjacent scan lines (e.g., scan lines 710a and 802a) are relatively temporally distant from each other, marking processes according to embodiments of the present invention can be adapted to form a mark having a desirable appearance faster than the conventional marking process, while also overcoming the aforementioned limitations associated with high thermal loads that can undesirably damage the article 100 (e.g., by generating cracks within the layer 104, by inducing at least a partial delamination of the layer 104 from the substrate 102, or the like, or a combination thereof), or that can undesirably change the visual appearance of the article 100, or the like or a combination thereof. Referring to FIG. 9, and after forming the second line set 802, the laser system 112 may be actuated and/or the article support 116 may be moved such that additional scanning processes may be performed to generate additional line sets. As exemplarily shown, the aforementioned processes may be repeated to form a third line set 900 (e.g., which includes scan lines 900a and 900b) and a fourth line set 902 (e.g., which includes scan lines 902a and 902b). In one embodiment, the third line set 900 may be formed before the fourth line set 902. In another embodiment, however, the fourth line set 902 may be formed before the third line set 900. Upon forming the scan lines as exemplarily discussed above, a composite scan line 904 is created, which including scan lines from the first line set 710, the second line set 802, the third line set 900 and the fourth line set 902. Further, a the space between scan lines (e.g., scan lines 710a and 710b) of a line set (e.g., the first line set 710) is occupied with a desired number of offset scan lines (e.g., three scan lines) to form a scan line region.

In embodiments of the marking process exemplarily discussed above with respect to FIGS. 7 to 9, laser pulses are directed to impinge upon the article 100 to generate a composite scan line in which spot areas within the same scan line overlap one another and in which spot areas of adjacent scan lines also overlap one another. In other embodiments, however, laser pulses can be directed to impinge upon the article 100 to generate a composite scan line in which spot areas within the same scan line do not overlap one another, in which spot areas of neighboring or adjacent scan lines do not overlap one another, or a combination thereof.

Figure 10:
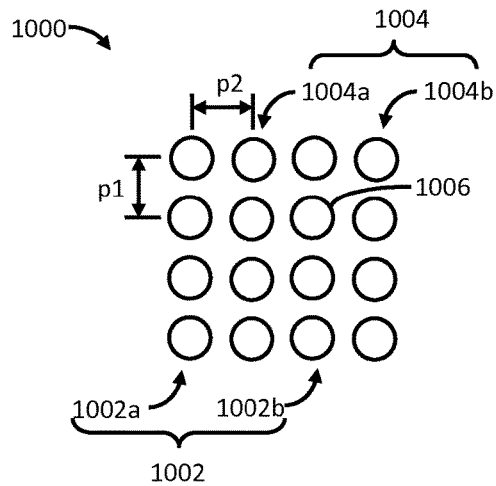
FIGS. 10 and 11 schematically illustrate exemplary arrangements of spot areas generated as a result of marking processes according to other embodiments.

For example, and with reference to FIG. 10, a composite scan line 1000 can be formed by a marking process that includes two scanning processes performed as exemplarily described above. In the illustrated embodiment, however, laser pulse characteristics in each scanning process can be selected to form a line set 1002 (e.g., including scan lines 1002a and 1002b) and a line set 1004 (e.g., including scan lines 1004a and 1004b), in which spot areas within the same scan line do not overlap one another and in which spot areas within different scan lines do not overlap another. As illustrated, the aforementioned scan pitch (identified here as, p1) between neighboring or adjacent spot areas within the same scan line is greater than the aforementioned spot width, d, of the spot areas. In other embodiments, however, the scan pitch, p1, may be equal to the spot width, d. The aforementioned line pitch (identified here as, p2) between spot areas in neighboring or adjacent scan lines is greater than the aforementioned spot width, d, of the spot areas. In other embodiments, however, the line pitch, p2, may be equal to the spot width, d. In the illustrated embodiment, the scan pitch, p1, is constant along the scan direction 700 and is equal to the line pitch, p2, which is constant along the fill direction 800. Moreover, the spot areas within the line sets 1002 and 1004 are aligned relative to one another such that four spot areas can be equally spaced apart from the same spot area (e.g., spot area 1006). In other embodiments, however, the scan pitch, p1, can vary along the scan direction 700, the line pitch, p2, can vary along the fill direction 800, or a combination thereof. In still other embodiments, the scan pitch, p1, can be greater than or less than the line pitch p2.

Figure 11:
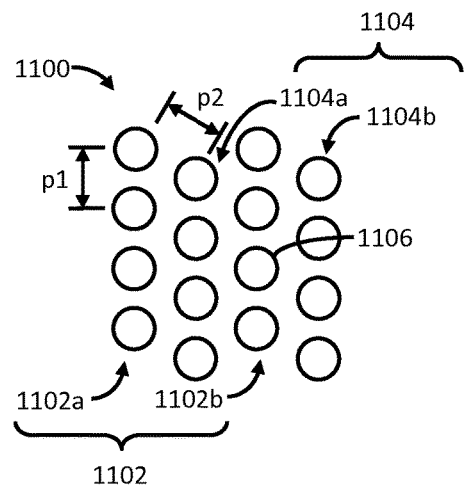

In another example, and with reference to FIG. 11, a composite scan line 1100 can be formed by a marking process that includes two scanning processes performed as exemplarily described above. In the illustrated embodiment, however, laser pulse characteristics in each scanning process can be selected to form a line set 1102 (e.g., including scan lines 1102a and 1102b) and a line set 1104 (e.g., including scan lines 1104a and 1104b), in which spot areas within the same scan line do not overlap one another and in which spot areas within different scan lines do not overlap another. In the illustrated embodiment, the line pitch between, p2, is measured at an angle between the scan direction 700 and the fill direction 800. In the illustrated embodiment, the scan pitch, p1, is constant along the scan direction 700 and is equal to the line pitch, p2. In the illustrated embodiment, the cosine of the line pitch, p2, (i.e., cos(p2)) is constant along the fill direction 800. Moreover, the spot areas within the line sets 1002 and 1004 are aligned relative to one another such that six spot areas can be equally spaced apart from the same spot area (e.g., spot area 1106). In other embodiments, however, the scan pitch, p1, can vary along the scan direction 700, the cosine of the line pitch, p2, can vary along the fill direction 800, or a combination thereof. In still other embodiments, the scan pitch, p1, can be greater than or less than the line pitch p2.

The above-described process of forming any of the composite scan lines may be repeated as desired to form the mark 200. Thus, the mark 200 can be broadly characterized as a collection of mutually-offset spot areas (e.g., overlapping or spaced apart from one another), in which the center-to-center distance between neighboring or adjacent spot areas within the mark 200, measured along any direction (also referred to herein as the "spot pitch") is less than the aforementioned spot separation distance, a1. While a visually-desirable mark formed only of overlapping spot areas may be formed at a desirably high throughput, it will nevertheless be appreciated that the throughput of the marking process may be increased further if at least some of the spot areas do not overlap each other, thereby reducing the number of spot areas within the mark. Generally, the laser system 112 may be configured to direct laser pulses onto the article 100 to generate spot areas within a region of the article 100 where the mark 200 is to be formed. The edge 202 of the mark 200 may be defined by any suitable method. For example, in one embodiment, a mask or stencil (not shown) of the mark 200 may be provided (e.g., within the laser system 112, on the surface 108 of the article 100, or otherwise between the laser system 112 and the article 100. Thus to form the edge 202, the laser system 112 can be configured to direct the laser pulses (e.g., in the manner described above) onto and through the mask. Laser pulses that impinge upon the article 100 generate the aforementioned spot areas and alter the preliminary visual appearance to form the modified visual appearance. However, laser pulses that impinge upon the mask are prevented from generating spot areas and so do not alter the preliminary visual appearance to form the modified visual appearance.

In another embodiment, the edge 202 may be defined without use of the mask or stencil. For example, in one embodiment, the laser system 112 can be controlled to selectively direct laser pulses onto the article 100 so as to generate spot areas only at locations on the article 100 corresponding to the desired location of the mark 200. For example, and with reference to FIG. 12, the laser system 112 can be controlled to selectively direct laser pulses onto the article 100 so as to generate an arrangement 1200 of spot areas (e.g., indicated as solid-lined circles) only at locations on the article 100 at least substantially corresponding to the desired location of the mark 200 (e.g., at locations disposed at one side of an intended mark edge 1202). In one embodiment, the arrangement 1200 of spot areas can be generated by controlling the laser system 112 to form a series of composite scan lines (e.g., composite scan lines 1204a, 1204b, 1204c and 1204d), wherein each composite scan line includes two line sets (e.g., a first line set including scan lines 1206a and 1206b, and a second line set including scan lines 1208a and 1208b). However, the laser system 112 can be controlled to direct the laser pulses only at times during scanning processes when resultant spot areas will be generated at locations on the article 100 at least substantially corresponding to the desired mark location. Thus, the laser system 112 is controllable to direct laser pulses onto the article 100 to generate spot areas (e.g., indicated as solid-lined circles, such as spot area 1210a) within or sufficiently near to the desired mark location and not to direct laser pulses onto the article 100 at locations that would generate spot areas (e.g., indicated as dash-lined circles, such as spot area 1210b) outside the desired mark location.

Figure 12:
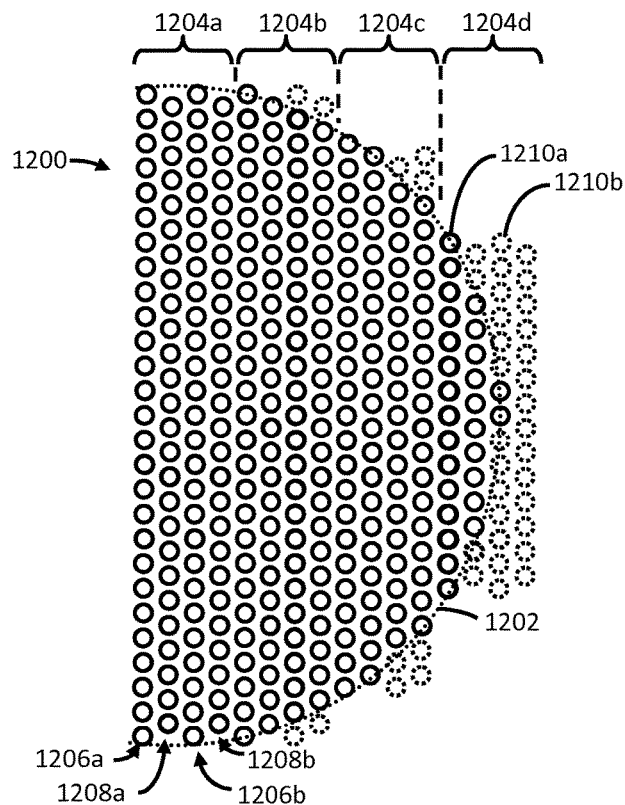
FIG. 12 schematically illustrates an exemplary arrangement of spot areas generated as a result of a marking process, within a portion of the mark shown in FIG. 2, according to one embodiment.

Although FIG. 12 illustrates the arrangement 1200 of spot areas as being provided in the manner described above with respect to FIG. 11, it will be appreciated that the arrangement 1200 of spot areas be provided in any suitable or desired manner (e.g., as described with respect to FIG. 9 or 10, or any other arrangement). Similarly, although FIG. 12 illustrates each composite scan line 1204a, 1204b, 1204c and 1204d having an arrangement of spot areas as exemplarily described with respect to FIG. 11, it will be appreciated that any composite scan line 1204a, 1204b, 1204c or 1204d can have any arrangement of spot areas as exemplarily described above with respect to FIG. 9 or 10, or any other suitable or desired arrangement. Although FIG. 12 illustrates the arrangement 1200 of spot areas as having at least substantially a 6-fold rotational symmetry, it will be appreciated that the rotational symmetry of the arrangement 1200 can be of any order, n, where n is 2, 3, 4, 5, 7, 8, or the like. Although FIG. 12 illustrates the arrangement 1200 of spot areas as being uniform throughout the area of the mark, it will be appreciated that the arrangement 1200 of spot areas may vary throughout the area of the mark.

Having exemplarily numerous embodiments of marking processes that may be performed to generate the mark 200 on the article 100, exemplary embodiments of the laser system 112 shown in FIG. 1, capable of performing embodiments of these marking processes, will now be described with reference to FIGS. 13 to 16.

Figure 13:
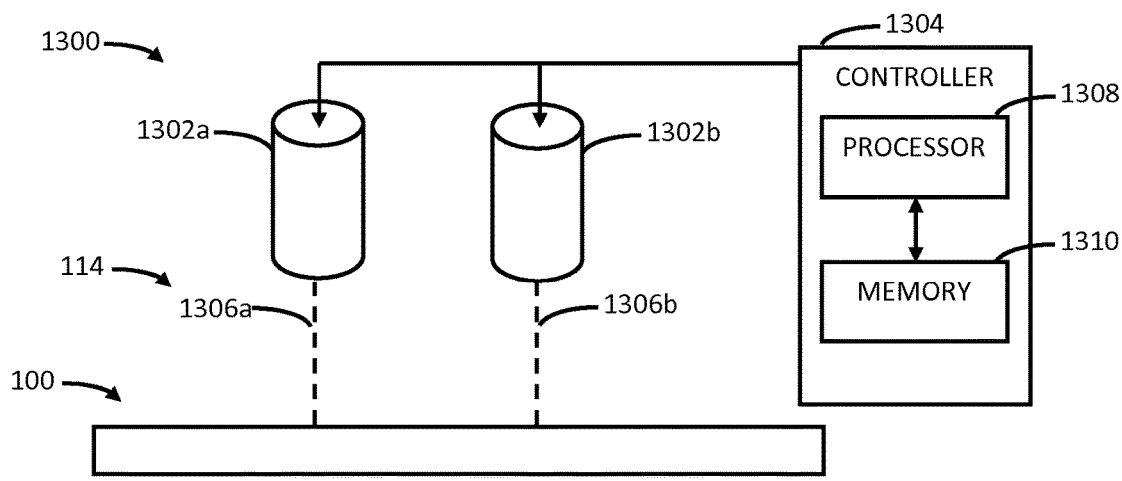
FIGS. 13 and 14 schematically illustrate different embodiments of the laser system shown in FIG. 1.

Referring to FIG. 13, the laser system 112 may be provided as a laser system 1300 that includes two laser sources such as first laser source 1300a and second laser source 1300b and a controller 1304. Although not illustrated, the laser system 1300 may further include supplemental systems such as the aforementioned beam modification system, beam steering system, or the like or a combination thereof.

Generally, the first laser source 1302a is operative to generate a beam (e.g., as indicated by dashed line 1306a) of laser pulses. Similarly, the second laser source 1302b is operative to generate a beam (e.g., as indicated by dashed line 1306b) of laser pulses. Laser pulses within the beam 1306a can be shaped, expanded, focused, scanned, etc., by the aforementioned supplemental systems as desired to be subsequently directed to impinge upon the article 100. Similarly, laser pulses within the beam 1306b can be shaped, expanded, focused, scanned, etc., by the aforementioned supplemental systems as desired to be subsequently directed to impinge upon the article 100. Laser pulses with the beams 1306a and 1306b can be shaped, expanded, focused, scanned, etc., by common supplemental systems or by different sets of supplemental systems. Although the laser system 1300 is illustrated as including only two laser sources, it will be appreciated that the laser system 1300 may include three or more laser sources.

The controller 1306 may control the laser sources 1300a and 1300b and any desired supplemental systems to sequentially direct groups of laser pulses onto the article 100 such that at least two laser pulses with a group impinge upon the article 100 (e.g., simultaneously or sequentially) at spot areas as exemplarily discussed above. For example, a laser pulse within beam 1306a may impinge the article 100 to generate a spot area on the article corresponding to spot area 1302a shown in FIG. 3. Likewise, a laser pulse within beam 1306b may impinge the article 100 to generate a spot area on the article corresponding to spot area 1302b shown in FIG. 3.

As shown, the controller 1304 may include a processor 1308 communicatively coupled to memory 1310. Generally, the processor 1308 can include operating logic (not shown) that defines various control functions, and may be in the form of dedicated hardware, such as a hardwired state machine, a processor executing programming instructions, and/or a different form as would occur to those skilled in the art. Operating logic may include digital circuitry, analog circuitry, software, or a hybrid combination of any of these types. In one embodiment, processor 1308 includes a programmable microcontroller microprocessor, or other processor that can include one or more processing units arranged to execute instructions stored in memory 1310 in accordance with the operating logic. Memory 910 can include one or more types including semiconductor, magnetic, and/or optical varieties, and/or may be of a volatile and/or nonvolatile variety. In one embodiment, memory 1310 stores instructions that can be executed by the operating logic. Alternatively or additionally, memory 1310 may store data that is manipulated by the operating logic. In one arrangement, operating logic and memory are included in a controller/processor form of operating logic that manages and controls operational aspects of any component of the apparatus described with respect to FIG. 1, although in other arrangements they may be separate.

Figure 14:
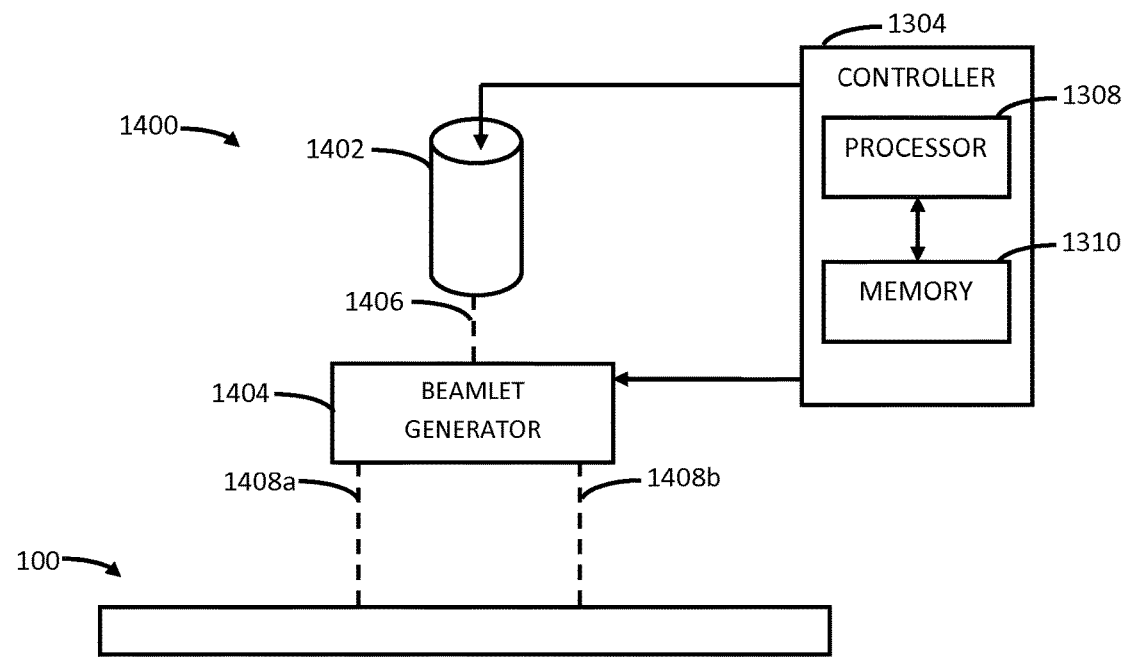

Referring to FIG. 14, the laser system 112 may be provided as laser system 1000 including a laser source 1402, a beamlet generator 1404, and the aforementioned controller 904. Although not illustrated, the laser system 1400 may further include supplemental systems such as the aforementioned beam modification system, beam steering system, or the like or a combination thereof.

As with the laser system 1300, the laser source 1402 in the laser system 1400 is operative to generate a beam (e.g., as indicated by dashed line 1406) of laser pulses. The beamlet generator 1404 is configured to receive the beam 1406 of laser pulses and generate corresponding beamlets (e.g., as indicated by dashed lines 1408a and 1408b) of laser pulses. In one embodiment, the beamlets 1408a and 1408b are generated from the beam 1404 by, for example, temporally modulating the beam 1406, by spatially modulating the beam 1406, or the like or a combination thereof. Such modulation of the beam 1406 can be effected by diffracting at least a portion of the beam 1406, reflecting at least a portion of the beam 1406, refracting at least a portion of the beam 1406, or the like or a combination thereof. Accordingly, the beamlet generator 1404 may include a temporal modulation element such as a mirror (e.g., a spindle mirror, a MEMS mirror, etc.), an acousto-optic deflector (AOD), an electro-optic deflector (EOD), or the like or a combination thereof, or a spatial modulation element such as a diffractive optical element (DOE), a refractive optical element such as a multi-lens array, or the like or a combination thereof. It will be appreciated, however, that the beamlet generator 1404 may include any combination of modulation elements. Modulation elements can also be classified as passive modulation elements (e.g., as with the DOE, etc.) of as active modulation elements (e.g., as with the spindle mirror, the AOD, the EOD, etc.). Active modulation elements may be driven under the control of the controller 1304 to modulate the beam 1406 whereas passive modulation elements need not be driven by the controller 1304 to effect modulation of the beam 1406.

Laser pulses within the beamlets 1408a and 1408b can be shaped, expanded, focused, scanned, etc., by the aforementioned supplemental systems as desired to be subsequently directed to impinge upon the article 100. Laser pulses with the beamlets 1408a and 1408b can be shaped, expanded, focused, scanned, etc., by the same supplemental systems or by different sets of supplemental systems. Although the beamlet generator 1004 is illustrated as being configured to generate only two beamlets 1408a and 1408b, it will be appreciated that the beamlet generator 1404 laser system 1400 may be configured as desired to generate more than two beamlets.

Depending on the configuration of the beamlet generator 1404, the controller 1304 may control one or both of the laser source 1402 and the beamlet generator 1404, and any desired supplemental systems, to sequentially direct groups of laser pulses onto the article 100 such that at least two laser pulses with a group impinge upon the article 100 (e.g., simultaneously or sequentially) at spot areas as exemplarily discussed above. For example, a laser pulse within beamlet 1408a may impinge the article 100 to generate a spot area on the article corresponding to spot area 302a shown in FIG. 3. Likewise, a laser pulse within beamlet 1408b may impinge the article 100 to generate a spot area on the article corresponding to spot area 302b shown in FIG. 3.

In embodiments in which the beam 1406 is modulated at the beamlet generator 1404 by a spatial modulation element such as a DOE, the controller 1304 may simply control the laser source 1402 and any desired supplemental systems such that at least two laser pulses with a group impinge upon the article 100 simultaneously (or substantially simultaneously) at spot areas as exemplarily discussed above. In embodiments in which the beam 1406 is modulated at the beamlet generator 1404 by a temporal modulation element, the controller 1304 may control the laser source 1402 and the beamlet generator 1404 in a coordinated manner, along with any desired supplemental systems, such that at least two laser pulses with a group impinge upon the article 100 sequentially at spot areas as exemplarily discussed above.

Although the laser system 1400 has been illustrated as including only one laser source 1402 and only one beamlet generator 1404, it will be appreciated that the laser system 1400 may include any number of additional laser sources, any number of additional beamlet generators, or a combination thereof. In such embodiments, the beams of any number of laser sources may be modulated by the same beamlet generator or by different beamlet generators. In another embodiment, the beams of any number of laser sources may not be modulated by any beamlet generator.

Having exemplarily described the beamlet generator 1404 in connection with the laser system 1400 shown in FIG. 14, some embodiments of the beamlet generator 1404 laser system 112 will now be described with reference to FIGS. 15 to 16.

Figure 15:
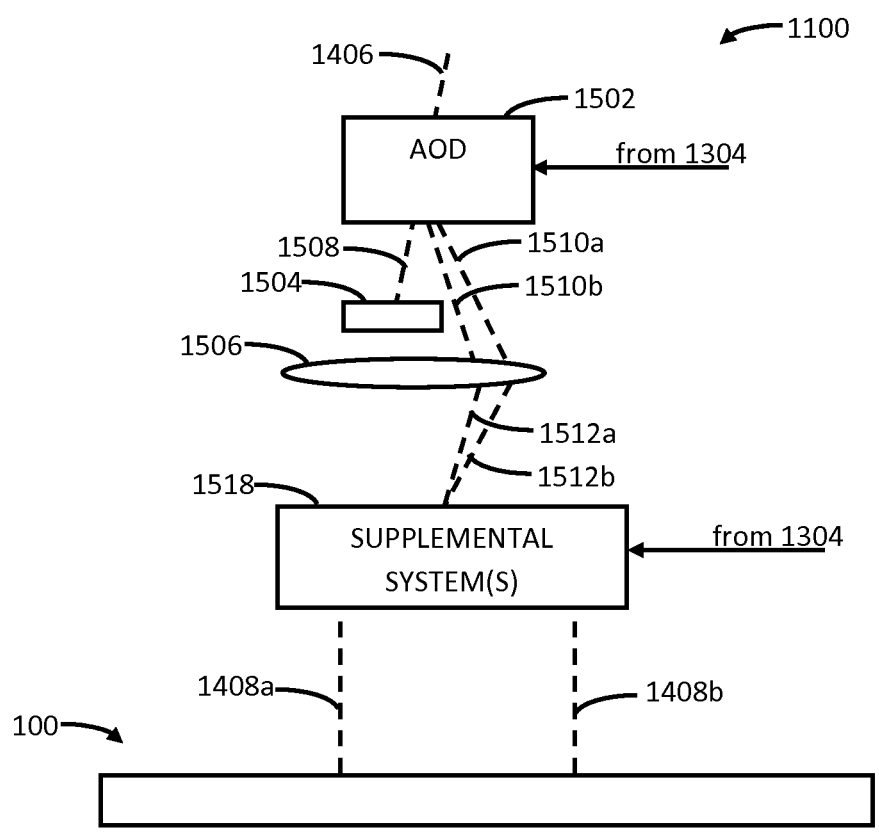
FIGS. 15 and 16 schematically illustrate different embodiments of the beamlet generator shown in FIG. 14.

Referring to FIG. 15, the beamlet generator 1404 may be provided as a beamlet generator 1500 including an active modulation element 1502, an optional beam mask 1504, an optional relay lens 1506 and one or more of the aforementioned supplemental systems (generically indicated at box 1518).

In the illustrated embodiment, the modulation element 1502 is provided as an AOD, and the beam mask 1504 provided to optionally block (if desired) the zeroth order beam 1508 transmitted through the AOD 1502. It will nevertheless be appreciated that the modulation element 1502 can be provided as a spindle mirror, an EOD, or the like or a combination thereof.

The modulation element 1502 deflects (e.g., diffracts, in the illustrated embodiment, away from the zeroth order beam 1508) pulses within the beam 1006 at an angle corresponding to characteristics of the signal (e.g., RF frequency, in the illustrate embodiment) applied to the modulation element 1502 (e.g., from a signal source incorporated as part of the modulation element 1502, under control of the controller 1304). By coordinating the signal characteristics applied to the modulation element 1502 with the generation of laser pulses by the laser source 1402 and propagated within the beam 1406, the controller 1304 can selectively direct individual laser pulses within the beam 1406 along one of many deflected beam paths (e.g., along one of two first order deflected beam paths 1510*a* and 1510*b*, in the illustrated embodiment). Although only two deflected beam paths 1510*a* and 1510*b* are illustrated, it will be appreciated that any number of deflected beam paths may be generated depending upon the characteristics of the modulation element 1502, characteristics of the signal applied to the modulation element 1502, the pulse repetition rate of laser pulses within the beam 1406, the average power of laser pulses in the beam 1406 (e.g., which can be in a range from 10 W to 400 W), or the like or a combination thereof. Laser pulses transmitted along a deflected beam path can then be processed (e.g., focused by the relay lens 1506), if desired, and propagated further along corresponding paths (e.g., paths 1512*a* and 1512*b*), and then be shaped, expanded, focused, scanned, etc., by the aforementioned one or more supplemental systems as desired (e.g., as indicated at box 1518).

Although not illustrated, the beamlet generator 1500 may further include one or more modulation elements such as active modulation element 1602, a passive modulation element, or the like or a combination thereof, configured to further modulate pulses within one or more of the paths 1510*a*, 1510*b*, 1512*a*, 1512*b*, or the like or a combination thereof. These further-modulated pulses may then be shaped, expanded, focused, scanned, etc., by the aforementioned one or more supplemental systems as desired (e.g., as indicated at box 1518).

Figure 16:
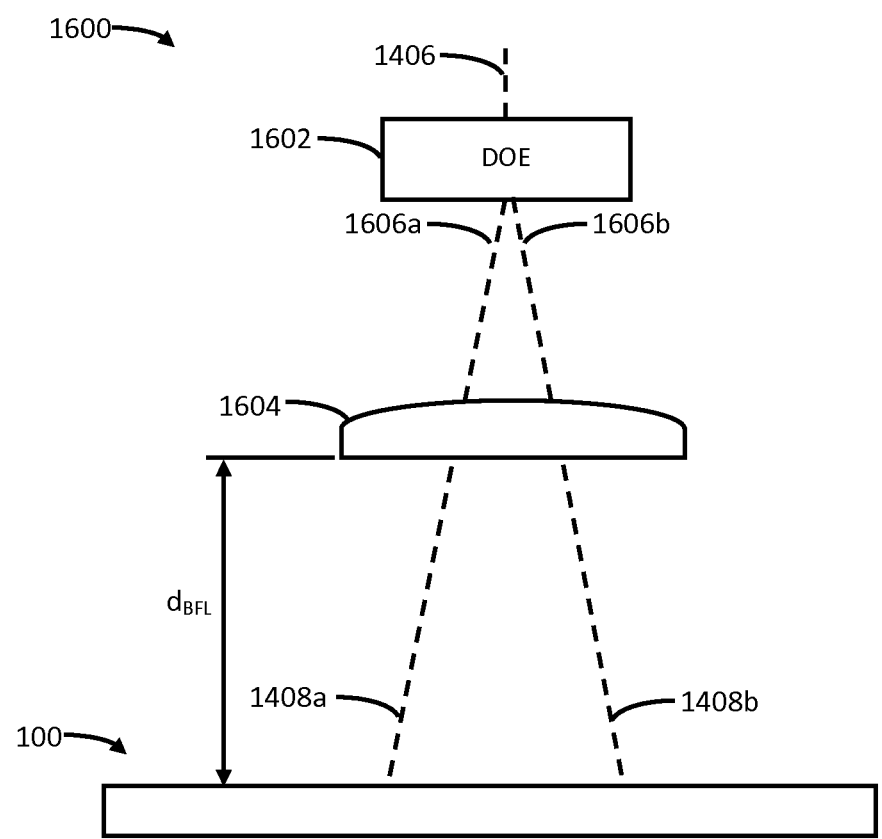

Referring to FIG. 16, the beamlet generator 1404 may be provided as a beamlet generator 1600 including a passive modulation element 1602 (e.g., a DOE) and an optional focusing lens 1604. The modulation element 1602 splits each pulse within the beam 1406 into a group of pulses that are propagated along one of a corresponding number of diffracted beam paths (e.g., diffracted beam paths 1606*a* and 1606*b*). Although only two diffracted beam paths 1606*a* and 1606*b* are illustrated, it will be appreciated that any number of diffracted beam paths may be generated depending upon the characteristics of the modulation element 1602, the average power of the pulses in the beam 1406 (e.g., which can be in a range from 10 W to 400 W), or the like or a combination thereof. Laser pulses transmitted along the diffracted beam paths 1606*a* and 1606*b* can then be processed (e.g., shaped, expanded, scanned, etc.) by one or more of the aforementioned supplemental systems (not shown) as desired before or after having been focused by the focusing lens 1604. In the illustrated embodiment, the spot separation distance, a1, between adjacent spot areas on the article 100 can be adjusted by changing the distance, $d_{BFL}$, between the focusing lens 1604 and the article 100.

Although not illustrated, the beamlet generator 1600 may further include one or more additional modulation elements such as active modulation element 1502, passive modulation element 1602, or the like or a combination thereof, configured to further modulate pulses within one or more of the diffracted beam paths (e.g., one or both of diffracted beam paths 1606*a*, 1602*b*). These further-modulated pulses may be directed into the focusing lens 1604, focused, and subsequently directed onto the article 100. Additionally, or alternatively, one or more of the additional modulation elements can be provided to further modulate pulses within one or more of the beamlets (e.g., beamlets 1408*a* and 1408*b*).

As exemplarily described above, laser pulses within beamlets (e.g., beamlets 1408*a* and 1408*b*) generated by the beamlet generator 1404 are derived from laser pulses within the beam 1406 generated by the laser source 1402. However, one or more characteristics (e.g., average power, peak power, spot shape, spot size, etc.) of a laser pulse within one beamlet may be different from one or more corresponding characteristics of a laser pulse within another beamlet. This difference in laser pulse characteristics can be attributable to the modulation characteristics of the modulation element (e.g., an AOD, an EOD, etc.) within the beamlet generator 1404. As a result of these differences, a laser pulses within one beamlet may modify the preliminary visual appearance of the article 100 at a corresponding spot areas in a slightly different manner from a lasers pulse within another beamlet.

Figure 17:
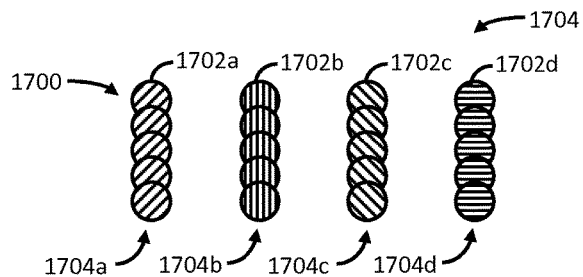
FIGS. 17 to 20 schematically illustrate a marking process according to still another embodiment.

For example, and with reference to FIG. 17, the beamlet generator 1404 can direct four beamlets of laser pulses onto the article 100, such that a group of four laser pulses impinge upon the article 100 to generate a spot set 1700 including spot areas 1702*a*, 1702*b*, 1702*c* and 1702*d* on the article 100. If laser pulses within two or more or all of the beamlets have different characteristics, then the modified visual appearance of the article 100 at one spot area (e.g., spot area 1702*a*) may be different from the modified visual appearance of the article 100 at one or more or all of spot areas 1702*b*, 1702*c* and 1702*d*. In some embodiments, each spot area may be sufficiently small enough such that the differences between the modified visual appearances among the spot areas in the spot set 1700 are not significant. Further, the spot width of each spot area may be sufficiently small enough such that, after performing a scanning process to form a line set 1704 (e.g., including a scan line 1704*a* formed of spot areas 1702*a*, a scan line 1704*b* formed of spot areas 1702*b*, a scan line 1704*c* formed of spot areas 1702*c* and a scan line 1704*d* formed of spot areas 1702*d*, the differences between the modified visual appearances among the scan lines in the line set 1704 are not significant. However, if the aforementioned scanning process is repeated in the manner described above respect to FIGS. 8 and 9, then the resultant composite scan lines will effectively include a scan line region including only scan lines formed of spot areas 1702*a* generated by laser pulses within only one beamlet, a scan line region including only scan lines formed of spot areas 1702*b* generated by laser pulses within only one beamlet, a scan line region including only scan lines formed of spot areas 1702*c* generated by laser pulses within only one beamlet, and a scan line region including only scan lines formed of spot areas 1702*d* generated by laser pulses within only one beamlet. Depending on factors such as the differences in modified visual appearance provided by spot areas 1702a, 1702b, 1702c and 1702d, the spot separation distance, a1, between spot areas within a spot set, the scan pitch between spot areas within the mark 200, the line pitch between scan lines within the mark 200, and the like, the differences between the modified visual appearances among the various scan line regions of the composite scan line can be significant.

Figure 18:
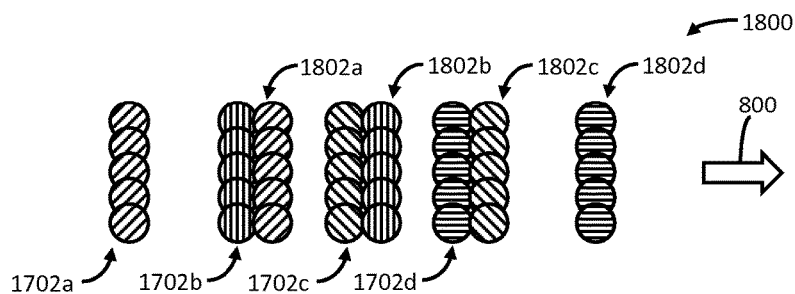

In one embodiment, the aforementioned differences between the modified visual appearances among the various scan line regions of the composite scan line can be undesirable. Accordingly, and with reference to FIGS. 18 to 20, a marking process according to yet another embodiment can be implemented to eliminate or otherwise reduce the undesirable effects associated with forming a composite scan line having one or more scan line regions including only scan lines formed of spot areas generated by laser pulses within only one beamlet. Referring to FIG. 18, after a first line set (e.g., the aforementioned line set 1704) is formed, the laser system 112 may be actuated and/or the article support 116 may be moved (e.g., in the manner described above with respect to FIG. 8) to form a second line set 1800 offset from the previously-formed first line set 1704 by an amount greater than aforementioned the line pitch (e.g., by an amount at least substantially equal to the aforementioned line set pitch plus one line pitch). In one embodiment, the second line set 1800 can include a scan line 1802a formed of the spot areas 1702a, a scan line 1804b formed of the spot areas 1702b, a scan line 1802c formed of the spot areas 1702c and a scan line 1802d formed of the spot areas 1702d. Moreover, the second line set 1800 is offset from the first line set 1704 such that scan lines 1802a, 1802b and 1802c are offset from the scan lines 1704b, 1704c, and 1704d, respectively, by the aforementioned line pitch.

Figure 19:
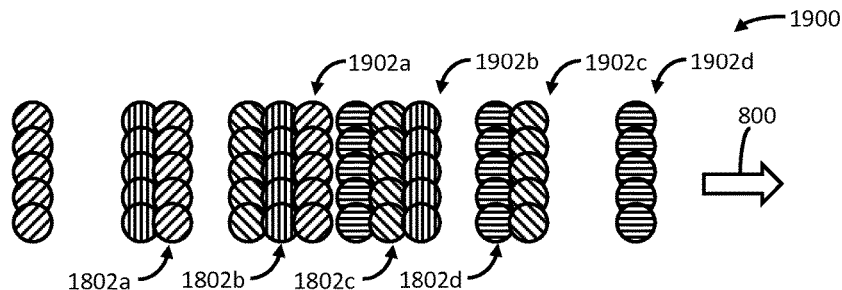

Thereafter, and with reference to FIG. 19, the aforementioned scanning process may be repeated to form a third line set 1900 offset from the second line set 1800 by an amount greater than aforementioned the line pitch (e.g., by an amount at least substantially equal to the aforementioned line set pitch plus one line pitch). As illustrated, the third line set 1900 includes a scan line 1902a formed of the spot areas 1702a, a scan line 1904b formed of the spot areas 1702b, a scan line 1904c formed of the spot areas 1702c and a scan line 1904d formed of the spot areas 1702d. The third line set 1900 is offset from the second line set 1800 such that scan lines 1902a, 1902b and 1902c are offset from the scan lines 1802b, 1802c, and 1802d, respectively, by the aforementioned line pitch.

Figure 20:
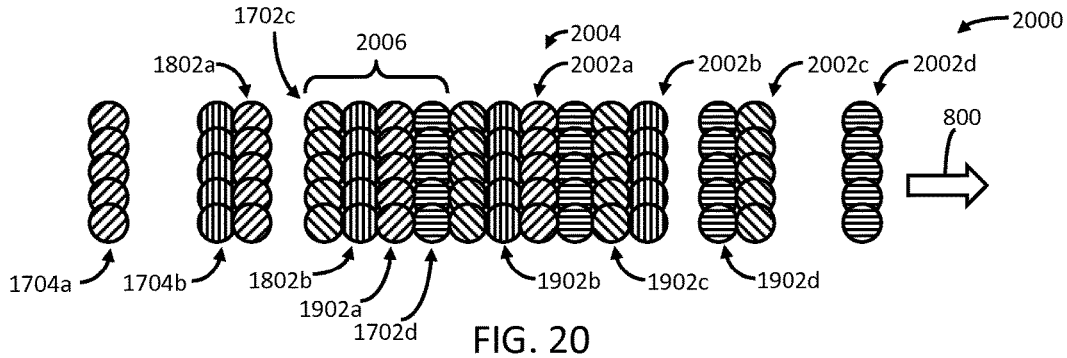

Subsequently, and with reference to FIG. 20, the scanning process is repeated to form a fourth line set 2000 offset from the third line set 1900 by an amount greater than aforementioned the line pitch (e.g., by an amount at least substantially equal to the aforementioned line set pitch plus one line pitch). As illustrated, the fourth line set 2000 includes a scan line 2002a formed of the spot areas 1702a, a scan line 2004b formed of the spot areas 1702b, a scan line 2004c formed of the spot areas 1702c and a scan line 2004d formed of the spot areas 1702d. The fourth line set 2000 is offset from the third line set 1900 such that scan lines 2002a, 2002b and 2002c are offset from the scan lines 1902b, 1902c, and 1902d, respectively, by the aforementioned line pitch. As further shown in FIG. 20, scan lines 2002a, 2002b and 2002c are offset from the scan line 1702d of the first line set 1704 by the aforementioned line pitch. The process described above may be repeated as desired until the mark is formed as desired.

In the marking process described above with respect to FIGS. 17 to 20, line sets are repeatedly generated to be offset from previously-formed line sets in the fill direction (e.g., along the direction indicated by arrow 800). As a result, certain scan lines (also referred to as "stray lines") generated during the marking process may not be included in a composite scan line based on when they were generated during the marking process. For example, stray lines such as scan lines 1704a, 1704b and 1802a will not be included within the composite scan line 2004. Further if no additional line sets are generated after generating line set 2000, then scan lines 1902d, 2002c and 2002d will also not be included in the composite scan line 2004 and would be stray lines. In embodiments in which the stray lines would modify the preliminary visual appearance of the article 100 in such a manner as to degrade the appearance of the mark 200, the laser system 112 may be controlled to not direct laser pulses onto the article 100 at locations on the article 100 that would generate the stray lines.

Similar to the marking process described above with respect to FIGS. 7 to 9, the marking process described above with respect to FIGS. 17 to 20 produces a composite scan line formed of scan lines from the first line set 1704, the second line set 1800, the third line set 1900 and the fourth line set 2000. According to the illustrated embodiment, however, scan line regions within the composite scan line 2004 include scan lines formed of spot areas 1702a, 1702b, 1702c and 1702d. For example, the composite scan line 2004 includes a scan line region 2006 formed of scan lines 1702c, 1802b, 1902a and 1702d, which are formed of spot areas 1702c, 1702d, 1702a and 1702b, respectively. Although not labeled, the composite scan line 2004 also includes an adjacent scan line region formed of scan lines 1802c, 1902b, 2002a and 1802d, which are formed of spot areas 1702c, 1702d, 1702a and 1702b, respectively. Because each scan line region includes scan lines formed of formed of spot areas generated by laser pulses within different beamlets (e.g., some or all beamlets capable of being generated by the beamlet generator 1404) the deleterious effects of undesirable differences between the modified visual appearances among the various scan line regions of the composite scan line can be eliminated or beneficially reduced.

The foregoing is illustrative of embodiments of the invention and is not to be construed as limiting thereof. Although a few example embodiments of the invention have been described, those skilled in the art will readily appreciate that many modifications are possible in the example embodiments without materially departing from the novel teachings and advantages of the invention. In view of the foregoing, it is to be understood that the foregoing is illustrative of the invention and is not to be construed as limited to the specific example embodiments of the invention disclosed, and that modifications to the disclosed example embodiments, as well as other embodiments, are intended to be included within the scope of the appended claims. The invention is defined by the following claims, with equivalents of the claims to be included therein.

What is claimed is:

1. A method of marking an article, comprising:
providing an article having a preliminary visual appearance; and
generating a plurality of groups of laser pulses, wherein at least one of the plurality of groups is generated by:
modulating a beam of laser pulses to form a plurality of beamlets, each of the plurality of beamlets including at least one laser pulse;

sequentially directing the plurality of groups of laser pulses onto the article such that laser pulses within the at least one of the plurality of groups impinge upon the article at spot areas that do not overlap one another, the sequentially directing comprising:

directing a first group of laser pulses onto the article, wherein laser pulses within the first group impinge upon the article at a first set of spot areas;

after directing the first group of laser pulses, directing a second group of laser pulses onto the article, wherein laser pulses within the second group impinge upon the article at a second set of spot areas offset from the first set of spot areas along a first direction; and after directing the second group of laser pulses, directing a third group of laser pulses onto the article, wherein laser pulses within the third group impinge upon the article at a third set of spot areas is offset from the first set of spot areas along a second direction different from the first direction, wherein at least one spot area within the third set of spot areas is located between at least two spot areas of the first set of spot areas, wherein laser pulses within the plurality of groups are configured to produce a visible mark on the article, the mark having a modified visual appearance different from the preliminary visual appearance.

2. The method of claim 1, wherein the article includes a substrate and a passivation layer adjacent to the substrate.

3. The method of claim 2, wherein the substrate comprises a metal.

4. The method of claim 3, wherein the passivation layer comprises an oxide of the metal.

5. The method of claim 2, wherein the substrate comprises aluminum.

6. The method of claim 1, wherein at least one of the laser pulses includes light having a wavelength greater than 340 nm.

7. The method of claim 1, wherein at least one of the laser pulses includes light having a wavelength greater than 750 nm.

8. The method of claim 1, wherein at least one of the laser pulses includes light having a wavelength less than 3000 nm.

9. The method of claim 1, wherein the at least one of the plurality of groups includes at least two laser pulses.

10. The method of claim 1, wherein the at least one of the plurality of groups includes at most 20 laser pulses.

11. The method of claim 1, wherein at least two of the plurality of groups include the same number of laser pulses.

12. The method of claim 1, wherein at least two of the plurality of groups include a different number of laser pulses.

13. The method of claim 1, wherein at least two laser pulses within the at least one of the plurality of groups simultaneously impinge upon the article.

14. The method of claim 1, wherein at least two laser pulses within the at least one of the plurality of groups sequentially impinge upon the article.

15. The method of claim 1, wherein at least one spot area in the second set overlaps a spot area in the first set.

16. The method of claim 1, wherein at least one spot area in the second set does not overlap any spot area in the first set.

17. The method of claim 1, wherein at least one spot area in the third set overlaps a spot area in the first set.

18. The method of claim 17, wherein the at least one spot area in the third set and the at least one spot area in the second set overlap different spot areas in the first set.

19. The method of claim 17, wherein the at least one spot area in the third set and the at least one spot area in the second set overlap the same spot area in the first set.

20. The method of claim 1, wherein at least one spot area in the third set does not overlap any spot area in the first set or the second set.

21. The method of claim 1, wherein, within the at least one of the plurality of groups, at least two of the laser pulses impinge upon the article at spot areas that are spaced apart from each another by a distance that is greater than a width of one of the spot areas.

22. The method of claim 1, wherein a width of at least one of the spot areas is in a range from 10 μm to 100 μm.

23. The method of claim 1, wherein the mark has a lightness factor magnitude, L*, that is different from a lightness factor magnitude of the preliminary visual appearance.

24. The method of claim 23, wherein the lightness factor magnitude, L*, of at least a portion of the mark is less than the lightness factor magnitude of the preliminary visual appearance.

25. The method of claim 23, wherein the lightness factor magnitude, L*, of at least a portion of the mark is greater than the lightness factor magnitude of the preliminary visual appearance.

26. The method of claim 1, wherein modulating the beam comprises diffracting at least one laser pulse within the beam.

27. The method of claim 1, wherein modulating the beam comprises refracting at least one laser pulse within the beam.

28. The method of claim 1, wherein modulating the beam comprises reflecting at least one laser pulse within the beam.

29. An article having a mark formed thereon according to the method as recited in claim 1.

30. An apparatus, comprising:
a laser system configured to direct laser pulses onto the article,
a controller coupled to the laser system, the controller comprising:
a processor configured to execute instructions to control the laser system to perform a method according to any of claims 1; and
a memory configured to store the instructions.

31. The apparatus of claim 30, wherein the laser system comprises a laser source configured to generate a beam of laser pulses.

32. The apparatus of claim 31, wherein the laser system comprises a plurality of laser sources.

33. The apparatus of claim 30, wherein the article marking system comprises a beamlet generator configured to modulate the beam of laser energy to form a plurality of beamlets, wherein each of the plurality of beamlets includes at least one laser pulse.

34. The apparatus of claim 33, wherein the beamlet generator comprises at least one selected from the group consisting of a spindle mirror, a diffractive optical element, an acousto-optic deflector, a refractive optical element and an electro-optic deflector.

* * * * *